US006252525B1

(12) United States Patent
Philiben

(10) Patent No.: US 6,252,525 B1
(45) Date of Patent: Jun. 26, 2001

(54) ANTI-COLLISION SYSTEM

(75) Inventor: Scott Philiben, Bend, OR (US)

(73) Assignee: Precise Flight, Inc., Bend, OR (US)

( * ) Notice: Subject to any disclaimer, the term of this patent is extended or adjusted under 35 U.S.C. 154(b) by 0 days.

(21) Appl. No.: 09/488,916

(22) Filed: Jan. 19, 2000

(51) Int. Cl.$^7$ ........................................ G08G 5/04
(52) U.S. Cl. .................. 340/961; 342/30; 342/462; 701/301
(58) Field of Search ........................ 340/961, 945, 340/958, 959, 960, 962, 982; 342/30, 450, 462; 701/301, 302

(56) References Cited

U.S. PATENT DOCUMENTS

| | | | |
|---|---|---|---|
| 3,203,305 | 8/1965 | Fairganks | 356/4.07 |
| 3,572,928 | 3/1971 | Decker, Jr. | 356/4.07 |
| 3,620,626 | 11/1971 | Daly | 356/5.08 |
| 3,641,491 | 2/1972 | Bath | 340/436 |
| 3,652,981 | 3/1972 | Campanella | 340/961 |
| 3,706,968 | * 12/1972 | Turner, Jr. | 340/982 |
| 3,846,746 | 11/1974 | Trageser | 340/961 |
| 4,139,848 | 2/1979 | Maxwell, Jr. | 342/30 |
| 4,277,170 | 7/1981 | Miles | 356/141.3 |
| 4,527,158 | 7/1985 | Runnels | 340/961 |
| 4,755,818 | 7/1988 | Conrad | 340/961 |
| 4,918,442 | 4/1990 | Bogart | 340/961 |
| 5,057,820 | 10/1991 | Markson | 340/600 |
| 5,206,644 | 4/1993 | Dempsey | 340/961 |
| 5,291,196 | 3/1994 | Defour | 340/961 |
| 5,317,316 | * 5/1994 | Sturm et al. | 342/30 |
| 5,321,489 | 6/1994 | Defour | 356/4.01 |
| 5,334,982 | * 8/1994 | Owen | 342/36 |
| 5,506,590 | * 4/1996 | Minter | 342/462 |
| 5,861,846 | * 1/1999 | Minter | 342/443 |
| 5,933,099 | * 8/1999 | Mahon | 340/961 |

* cited by examiner

Primary Examiner—Benjamin C. Lee
(74) Attorney, Agent, or Firm—Chernoff, Vilhauer, McClung & Stenzel, LLP

(57) ABSTRACT

An anti-collision system is provided to enhance the conspicuousness of an aircraft to a second aircraft presenting a collision threat. When the computer of an airborne Traffic Collision Avoidance System (TCAS) designates a second proximately located aircraft as a collision threat a traffic advisory is issued. A light controller responds to a traffic advisory signal from the TCAS computer by illuminating one or more of the aircraft's external lighting systems. TCAS II systems can also issue resolution advisory when the intruder poses a more immediate threat. A resolution advisory signal from the TCAS computer can be used to alter the lighting systems being activated or the rate of flashing to make the aircraft more noticeable. Alternating illuminating and obscuring of landing lights, taxi lights, deicing lights, strobe lights or rudder illumination lights enhances the conspicuousness of the aircraft to the crew of a second aircraft seeking to avoid a collision.

12 Claims, 3 Drawing Sheets

ANTI-COLLISION SYSTEM

BACKGROUND OF THE INVENTION

The present invention relates to an anti-collision system and, more particularly, to an automatic system for enhancing the conspicuousness of an aircraft to the crew of second aircraft posing a collision threat.

The primary mechanism of midair aircraft collision avoidance is a flight crew's application of the "see and avoid" principle. This principle is sufficiently significant to be codified in regulations related to flight operations. For example, U.S. Federal Aviation Administration (FAA) regulation, 14 C.F.R. §91.113, requires "when weather conditions permit, regardless of whether operation is conducted under instrument flight rules or visual flight rules, vigilance shall be maintained by each person operating an aircraft so as to see and avoid other aircraft."

The conspicuousness of an aircraft intruding on the airspace of another aircraft is significant to the timeliness of visual acquisition of the intruder by the crew of the other aircraft. Aircraft are equipped with external recognition lights to enhance their conspicuousness to other air traffic. Recognition lights include a position light system, including red and green forward lights indicating the right and left sides of the plane and a rear mounted white light. FAA regulations also require an anti-collision light system comprising sufficient numbers of flashing lights arranged to illuminate the vital areas around the airplane, considering its physical configuration and flight characteristics. The anti-collision light system must cover a field extending 75 degrees above and below the horizontal plane of the aircraft.

Despite the required external recognition lights and the attention given to the "see and avoid" principle, studies have shown that the primary cause of midair collisions is the failure of a pilot to see another aircraft that poses a threat of collision. Therefore, since the early 1990's, U.S. federal regulations have required that aircraft be equipped with a Traffic Alert and Collision Avoidance System (TCAS) (also known as Airborne Collision Avoidance System (ACAS)) to supplement the "see and avoid" principle. TCAS is an airborne radio system that locates and tracks the progress of aircraft equipped with beacon transponders. A TCAS transmitter in a first, tracking aircraft interrogates transponders of potentially intruding aircraft within range of the system (usually up to about 40 miles). Responding signals or replies from the transponders of aircraft in range are received through a directional antenna by a receiver in the tracking aircraft. The identification and altitude of the intruder are obtained from the replies and the distance and heading of the intruder is calculated and tracked by a TCAS computer in the tracking aircraft. The relative positions of intruders tracked by the TCAS computer are displayed in the tracking aircraft's cockpit.

If the TCAS computer calculates that an intruder is within approximately 35–40 seconds of a potential collision, the system will issue a traffic advisory (TA) indicating to the crew of the tracking aircraft that the intruder is a potential threat. The crew must visually locate the threat and may maneuver vertically with the assistance of air traffic control to resolve the threat. If the aircraft is equipped with a TCAS I system, advisories are limited to traffic advisories. If the tracking aircraft is equipped with a more comprehensive TCAS II system, the traffic advisory will be followed by an resolution advisory (RA) if the intruder approaches within approximately 20–30 seconds of a collision. The TCAS II system can determine whether the intruder is climbing, diving, or in level flight and will advise the pilots of the two aircraft of evasive vertical maneuvers to resolve the course conflict. Even with the TCAS system, the ability to quickly visually locate an intruder is important to avoiding midair collision hazards.

In addition to the position and anti-collision light systems, aircraft are equipped with taxi and landing lights used to illuminate the runway during take-off and landing. The bright landing lights may be used to increase the conspicuousness of an aircraft. For example, a voluntary FAA safety program, "Operation Lights On," recommends turning landing lights on during takeoff and when operating below 10,000 feet, day or night, especially within 10 miles of an airport or under conditions of reduced visibility. Aircraft may also include other external lights such as de-icing lights, strobe lamps, and rudder illumination that can be manually activated to increase conspicuousness and enhance visual acquisition of the aircraft. Switching combinations of these additional lights "on" and "off" can further improve the conspicuousness of the aircraft. Lighting controllers are available that automatically switch individual lights or lighting systems "on" and "off" when activated by the pilot. However, manual light activation can be unreliable, particularly when the aircrew busy searching for approaching traffic.

Campanella, U.S. Pat. No. 3,652,981, discloses a proximity warning system based on detection of an exterior flash lamp or strobe by an electro-optical sensor of a tracking aircraft. The output of the electro-optical sensor is displayed in the cockpit to warn of threatening traffic. In addition, an aural tone may sound to draw the pilot's attention to the situation. In one embodiment, the flash lamp is of an intruding aircraft can triggered by a signal from an airborne weather radar of the tracking aircraft. Once triggered, the flash of the lamp of the intruding aircraft is detected by the electro-optical sensor of the tracking aircraft to produce a warning. While the electro-optical sensor may be able to distinguish between the flash lamp of the proximity warning system and the flashing lamps of the anti-collision warning system on the basis of flash rate, an additional flashing lamp may not significantly enhance the conspicuousness of the aircraft to human observers and the conspicuousness of the tracking aircraft is unchanged by the system. The activation of the flashing light requires that the tracking aircraft be equipped with weather radar and that the potential intruder be equipped an additional radio receiver to detect scanning by the radar of the tracking aircraft. Further, the use of weather radar as part of a reliable proximity warning system is precluded by the limited geometry of the radar beam.

What is desired, therefore, is system that in response to detection of a potential collision threat automatically activates external lighting of an aircraft to enhance its conspicuousness.

SUMMARY OF THE INVENTION

The present invention overcomes the aforementioned drawbacks of the prior art by providing an anti-collision apparatus for an aircraft comprising a transmitter transmitting a transponder interrogation; at least one transponder receiving the interrogation and transmitting a reply thereto; a receiver receiving the reply; a computer interpreting the reply to designate at least one transponder as a threat; and a controller illuminating at least one external light of the aircraft in response to the designation of the threat by the computer. The anti-collision apparatus automatically responds to the designation of intruder as a collision threat by the Traffic Control Avoidance System (TCAS) by illuminating external lights of the a tracking aircraft. The external lights include the aircraft's taxi lights, landing lights, rudder illumination lights, deicing lights or additional strobe lights. The controller can steadily illuminate or alternately illuminate and obscure individual lights or systems of lights to give the appearance of motion and increase the visual conspicuousness under various weather and lighting conditions. Different lights can be illuminated or lights can be turned "off" and "on" at a differing rate when the intruder approaches the tracking aircraft and becomes a more immediate threat of collision.

The foregoing and other objectives, features and advantages of the invention will be more readily understood upon consideration of the following detailed description of the invention, taken in conjunction with the accompanying drawings.

DETAILED DESCRIPTION OF THE PREFERRED EMBODIMENT

Figure 1:
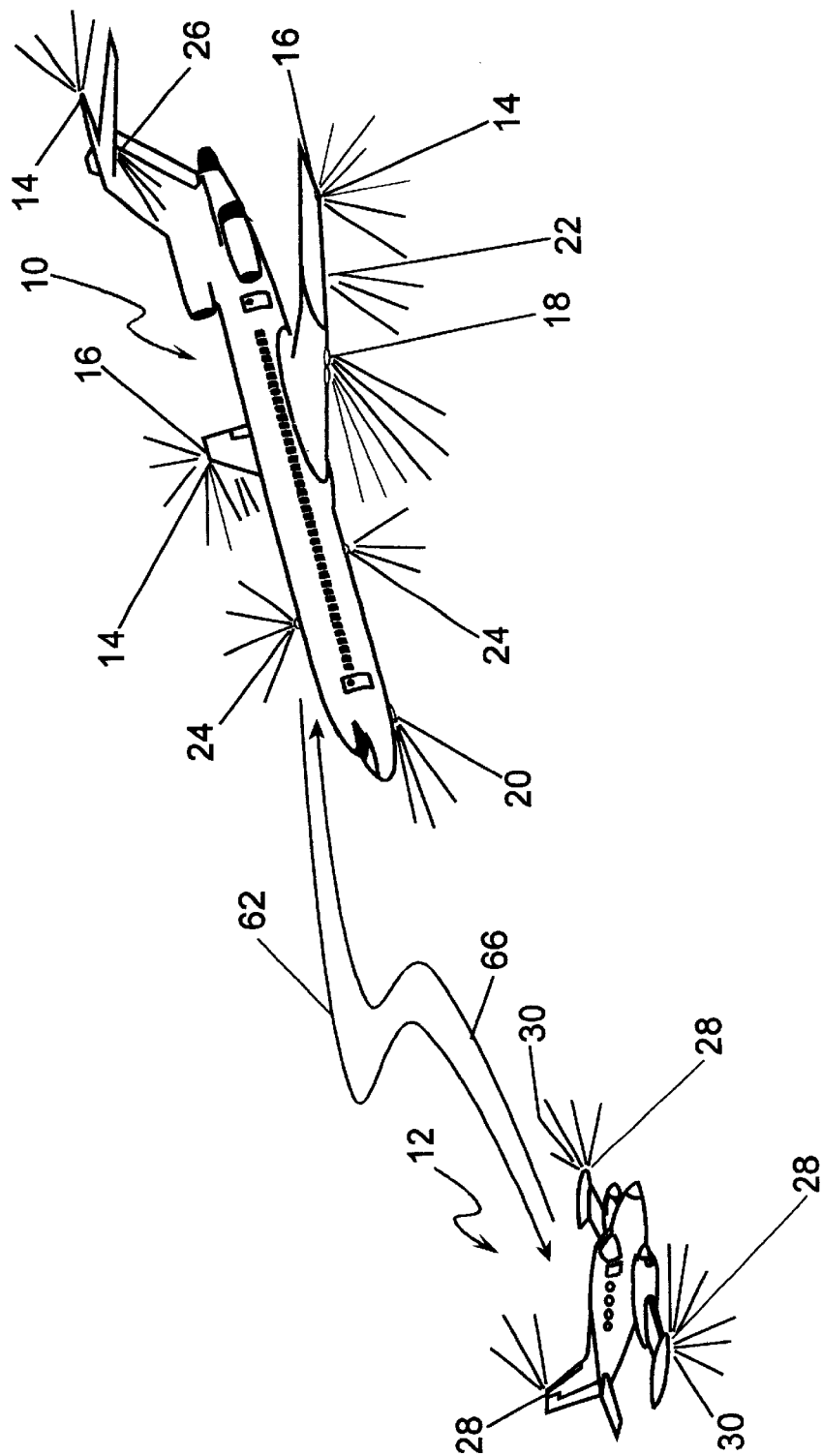
FIG. 1 is a perspective view of two aircraft approaching each other on potentially intersecting flight paths.

A tracking aircraft 10 and an intruder 12 approaching each other on potentially intersecting flight paths are illustrated in FIG. 1. The tracking aircraft 10 is equipped with position lights 14 and, one or more, flashing anti-collision lights 16. In addition to the position 14 and anti-collision 16 lights, the tracking aircraft 10 is equipped with a combination of landing lights 18, taxi lights 20, de-icing lights 22, strobe lights 24 and lights to illuminate a logo on the aircraft's rudder 26. If the tracking aircraft is a rotor craft it would also be equipped with rotor lights. Likewise, the intruder 12 is equipped with position lights 28 and anti-collision lights 30 and may be equipped with additional lighting systems (not illustrated) similar to those of the tracking aircraft 10.

Figure 2:
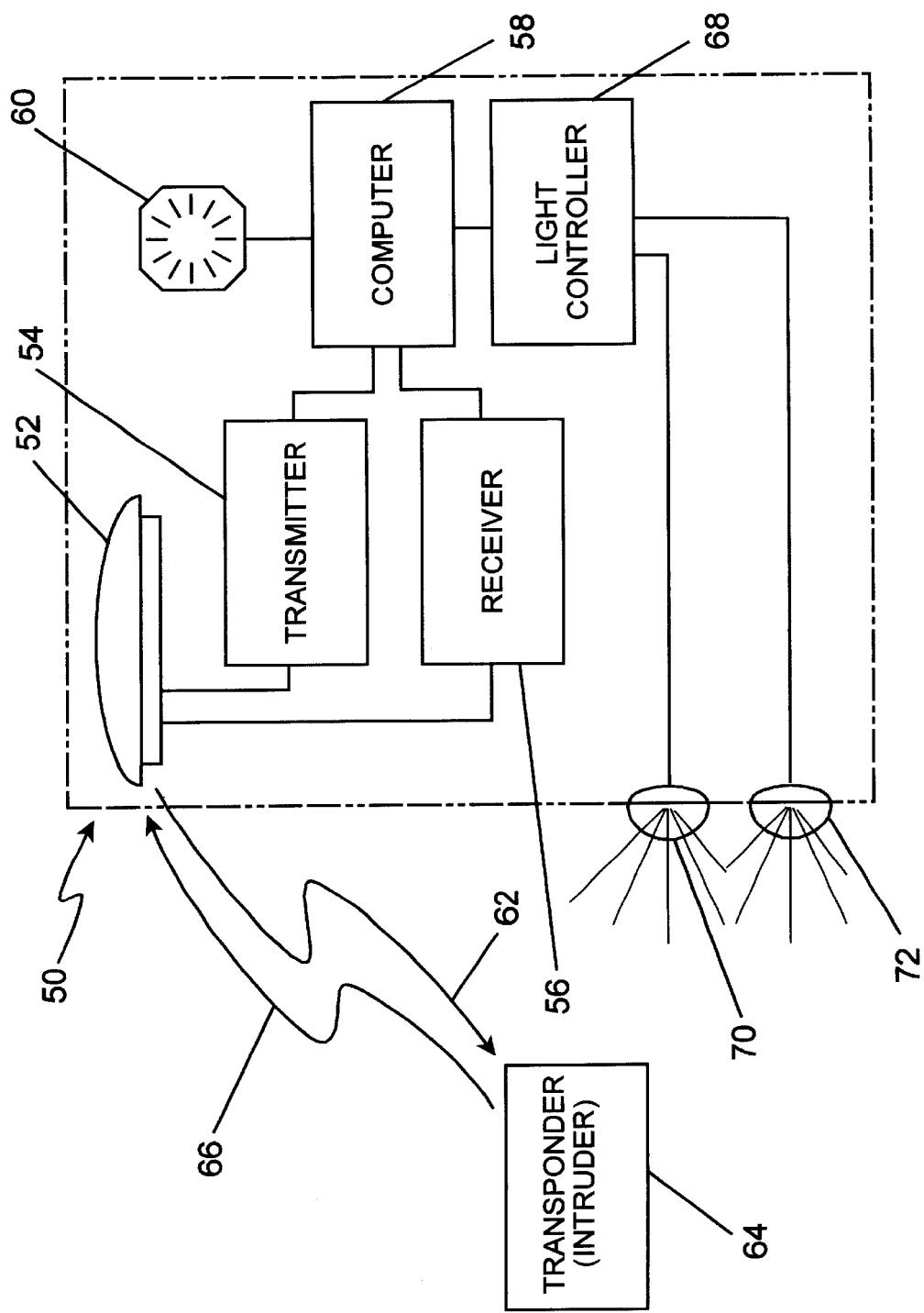
FIG. 2 is a block diagram of the anti-collision system of the present invention.

If operated in controlled airspace, both aircraft will also be equipped with a Traffic Collision Avoidance System (TCAS), Airborne Collision Avoidance System (ACAS), Traffic Collision Avoidance Detection (TCAD), Traffic Advisory System (TAS) or similar proximity warning system (hereinafter referred to collectively as TCAS). Referring to FIG. 2, the TCAS system 50 of the tracking aircraft 10 comprises one or more antennae, including a directional antenna 52, a transmitter 54, a receiver 56, a computer 58, and a cockpit display unit 60. The transmitter 54 of the tracking aircraft 10 interrogates or transmits a radio signal to the air traffic control transponders of aircraft in the vicinity. If an aircraft in range of the TCAS system is equipped with a transponder 64, an interrogation signal 62 from the TCAS transmitter 54 of the tracking aircraft 10 will cause a reply or responding signal 66 by the intruder's transponder 64. The reply identifies the intruder and its altitude. The TCAS computer 58 uses the time differential between the interrogation and the reply to determine the distance to the intruder 12. The TCAS computer 58 determines the direction of the intruder 12 relative to the tracking aircraft 10 from signal variations in the segments of the directional antenna 52. The computer 58 causes the relative positions of the tracking aircraft 10 and other aircraft in the vicinity, including the intruder 12, to be displayed on a TCAS display 60 in the cockpit of the tracking aircraft 10.

Figure 3:
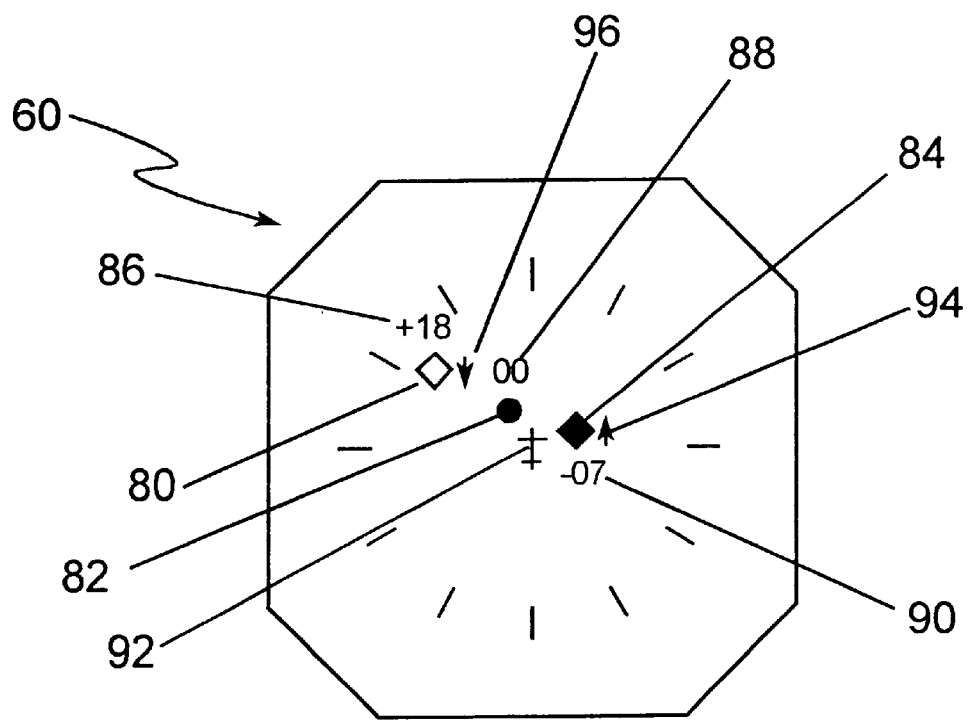
FIG. 3 illustrates an exemplary cockpit display for a Traffic Control Advisory System (TCAS).

Referring to FIG. 3, the TCAS cockpit display 60 indicates the positions 80, 82, and 84 and altitudes 86, 88, and 90 of aircraft in range of the TCAS system relative to the tracking aircraft 92. For example, "+18" 86 indicates that an aircraft is 1800 feet above the tracking aircraft and "−0.7" 90 indicates that a second aircraft is 700 feet below the tracking aircraft 92 as displayed on the exemplary display 60. If the tracking aircraft 10 and the intruder 12 are both equipped with a more comprehensive TCAS II system the display 60 will also indicate whether the intruder is climbing or descending at more than 500 feet per minute as indicated by an upward 94 or downward 96 pointing arrow.

When the intruder 12 is within approximately 45 seconds of its closest approach to the tracking aircraft 10, based on the calculated flight paths of the two aircraft, the computer 58 designates the intruding aircraft 12 as a collision threat based on the computer's interpretation of the intruder's transponder reply 66. When the intruder 12 is designated as a collision threat a traffic advisory (TA) is issued. Typically, a TA is indicated by a change in the shape of the aircraft symbol on the display 60. For example, the shape of the symbol might change from a diamond 80 to a circular dot 82. The TCAS may also include an annunciator that produces an audible warning, such as "traffic, traffic." When a TA is issued, the crew of the aircraft must attempt to locate the intruder 12 visually so that the conflict between the aircraft can be resolved. Aircraft with TCAS I systems are authorized to ascend or descend 300 feet, with approval of air traffic control, to resolve a traffic conflict.

Larger commercial passenger aircraft are required to be equipped with a more capable TCAS II system. In addition to the traffic advisory, the TCAS II system will issue a resolution advisory (RA) indicating a more immediate threat when the aircraft are approximately 35 seconds from their point of closet approach. When the resolution advisory is issued the aircraft symbol on the exemplary display 60 changes shape and the annunciator issues an audible maneuvering warning such as "climb, climb" to resolve the conflict. The TCAS II system includes provisions to coordinate with the TCAS II system of other aircraft to avoid mirror image maneuvers that would continue the flight path conflict between the aircraft.

When a traffic advisory is issued, the crew of the aircraft will attempt to visually locate the aircraft posing a collision threat. If both aircraft are equipped with the TCAS system, both crews will be seeking to visually locate the other craft when a traffic advisory is issued by the respective TCAS systems. While aircraft are equipped with position 14 and 28 and anti-collision lights 16 and 30 to aid in visual detection of the airplane, other lighting systems of the aircraft can be used to enhance the conspicuousness of the airplane. These additional lighting systems can include landing lights 18, taxi lights 20, de-icing lights 22, strobe lights 24 and rudder illumination lights 26. These additional lighting systems can be manually activated by the flight crew or the aircraft can be equipped with a lighting controller to automatically activate and deactivate predetermined individual lights or systems of lights when the controller is manually activated by the flight crew. However, manual activation of the various lighting systems requires diversion of the crew's attention from seeking to visually locate the intruder. The present inventor concluded that a signal from the TCAS system could be used to automatically illuminate external lights to enhance the conspicuousness of the aircraft when a threat is detected and timely visual acquisition of the aircraft is paramount.

Referring again to FIG. 2, when a traffic advisory is issued by the TCAS system of an aircraft equipped with the anti-collision system of the present invention, a signal is sent from the TCAS computer 58 to a light controller 68. The light controller 68 activates selected external lighting systems 70 and 72 of the tracking aircraft 10 to enhance the airplane's conspicuousness and increase the likelihood and timeliness of visual acquisition by the crew of the intruder 12. The light controller 68 can alternately activate and deactivate predetermined lighting systems 70 and 72 which can include the landing lights 18, taxi lights 20, deicing lights 22, strobe lights 24 and rudder illumination 26 as illustrated in FIG. 1. Alternately illuminating and obscuring individual lights or groups of lights spaced apart on the aircraft creates an illusion of side-to-side motion further enhancing the conspicuousness the aircraft. If lights are in close proximity, simultaneously activating and deactivating the lights can increase their conspicuousness. The lighting systems may be repeatedly activated and deactivated to create a flashing light or steady illumination may be maintained. Steady illumination may be preferred if clouds, rain or snow is present. Further, the frequency of activation and deactivation of selected lighting systems or the particular lighting systems activated can be changed in response to the issuance of a resolution advisory by the TCAS system when the intruder approaches within an area of more immediate collision threat. Altering the rate of flashing or the systems illuminated increases the conspicuousness of the aircraft.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. An anti-collision apparatus for an aircraft comprising:
   (a) a transmitter transmitting a transponder interrogation;
   (b) at least one transponder receiving said interrogation and transmitting a reply thereto;
   (c) a receiver receiving said reply;
   (d) a computer interpreting said reply to designate at least one said transponder as a threat; and
   (e) a controller illuminating at least one external light of said aircraft in response to said designation of said threat by said computer.

2. The apparatus of claim 1 wherein said external light comprises a landing light.

3. The apparatus of claim 1 wherein said external light comprises a taxi light.

4. The apparatus of claim 1 wherein said external light comprises a deicing light.

5. The apparatus of claim 1 wherein said external light is comprises a rudder illumination light.

6. The apparatus of claim 1 wherein said external light is comprises a strobe light.

7. The apparatus of claim 1 wherein said illuminating at least one external light comprises alternate illuminating and obscuring at least one of a landing light, a taxi light, a deicing light, strobe light, and a rudder illumination light .

8. An anti-collision apparatus for an aircraft comprising:
   (a) a transmitter transmitting a transponder interrogation;
   (b) at least one transponder receiving said interrogation and transmitting a reply thereto;
   (c) a receiver receiving said reply;
   (d) a computer interpreting said reply; and
   (e) a controller illuminating at least one external light on said aircraft in response to said computer's interpretation of said reply as a threat and illuminating at least one external light on said aircraft in response said computer's interpretation of said reply as an immediate threat.

9. The apparatus of claim 8 wherein said external light comprises at least one of a landing light, a taxi light, a deicing light, a strobe light, and a rudder illumination light.

10. The apparatus of claim 8 wherein said illumination of at least one external light by said controller in response to said interpretation of said reply by said computer comprises:
    (a) alternately illuminating and obscuring a said external light at a first rate when said computer interprets said reply to be a said threat; and
    (b) alternately illuminating and obscuring a said external light at a second rate when said computer interprets said reply to be a said immediate threat.

11. The apparatus of claim 8 wherein said illumination of at least one external light by said controller in response to said interpretation of said reply by said computer comprises:
    (a) illumination of at least one of a landing light, a taxi light, a deicing light, and a rudder illumination light in response to said interpretation of said reply as a threat; and
    (b) in response to said interpretation of said reply as a immediate threat, illumination of at least one of a landing light, a taxi light, a deicing light, and a rudder illumination light not illuminated in response to interpretation of said reply as a threat.

12. The apparatus of claim 8 wherein said illumination of at least one external light by said controller in response to said interpretation of said reply by said computer comprises:
    (a) alternately illuminating and obscuring at a first rate at least one of a landing light, a taxi light, a deicing light, and a rudder illumination light in response to said interpretation of said reply as a threat; and
    (b) in response to said interpretation of said reply as a immediate threat, alternately illuminating and obscuring at a second rate at least one of a landing light, a taxi light, a deicing light, and a rudder illumination light not illuminated in response to interpretation of said reply as a threat.

* * * * *